US012386167B2

(12) United States Patent
Liu et al.

(10) Patent No.: US 12,386,167 B2
(45) Date of Patent: *Aug. 12, 2025

(54) APPARATUSES, SYSTEMS AND METHODS FOR SOLID IMMERSION MENISCUS LENSES

(71) Applicant: University of Washington, Seattle, WA (US)

(72) Inventors: Jonathan T. C. Liu, Seattle, WA (US); Lindsey A. Barner, Seattle, WA (US); Adam K. Glaser, Seattle, WA (US)

(73) Assignee: University of Washington, Seattle, WA (US)

( * ) Notice: Subject to any disclaimer, the term of this patent is extended or adjusted under 35 U.S.C. 154(b) by 587 days.

This patent is subject to a terminal disclaimer.

(21) Appl. No.: 17/680,033

(22) Filed: Feb. 24, 2022

(65) Prior Publication Data

US 2022/0326502 A1 Oct. 13, 2022

Related U.S. Application Data

(63) Continuation of application No. 17/356,135, filed on Jun. 23, 2021, now Pat. No. 11,287,633, which is a
(Continued)

(51) Int. Cl.
*G02B 21/33* (2006.01)
*G02B 21/00* (2006.01)
(Continued)

(52) U.S. Cl.
CPC ......... *G02B 21/33* (2013.01); *G02B 21/0032* (2013.01); *G02B 21/248* (2013.01); *G02B 21/26* (2013.01); *G02B 21/367* (2013.01)

(58) Field of Classification Search
CPC ............ G02B 21/0004; G02B 21/0032; G02B 21/02; G02B 21/26; G02B 21/33;
(Continued)

(56) References Cited

U.S. PATENT DOCUMENTS 6,831,782 B2 * 12/2004 Patton .............. B29D 11/00394
359/396
7,227,702 B2 * 6/2007 Pakdaman ........... G11B 7/1387
359/368
(Continued)

FOREIGN PATENT DOCUMENTS

CN  1610843 A  4/2005
WO  2018002225 A1  1/2018
WO  2018166744 A1  9/2018

OTHER PUBLICATIONS

ISR/WO dated Mar. 24, 2020 for PCT Application No. PCT/US2020/013512.
(Continued)

*Primary Examiner* — Mustak Choudhury
(74) *Attorney, Agent, or Firm* — Dorsey & Whitney LLP

(57) ABSTRACT

Apparatuses, systems, and methods for solid immersion meniscus lenses (SIMlenses). An optical system may include a sample holder with a first side which supports a sample, and a second side opposite the first side. The second side of the sample holder may be in contact with an immersion fluid. Light passing between the sample and an objective lens may pass through the sample holder, immersion fluid, and a SIMlens positioned between the immersion fluid and objective. The SIMlens may have a first curved surface and a second curved surface, each of which may be shaped to match a wavefront of the light as it passes through the SIMlens. The immersion fluid, SIMlens, and environment containing the objective may all have different refractive indices.

20 Claims, 6 Drawing Sheets

Related U.S. Application Data continuation of application No. PCT/US2020/013512, filed on Jan. 14, 2020.

(60) Provisional application No. 62/792,138, filed on Jan. 14, 2019.

(51) Int. Cl.
 *G02B 21/24* (2006.01)
 *G02B 21/26* (2006.01)
 *G02B 21/36* (2006.01)

(58) Field of Classification Search
 CPC ........ G02B 21/36; G02B 21/248; G02B 3/00; G02B 3/04; G02B 3/06; G01N 21/00; G01N 21/01; G01N 21/0303; G01N 21/17; G01N 21/31
 See application file for complete search history.

(56) References Cited

U.S. PATENT DOCUMENTS

| | | | |
|---|---|---|---|
| 10,409,052 | B2 | 9/2019 | Liu et al. |
| 2006/0077788 | A1* | 4/2006 | Shinoda ............... G11B 7/1374 |
| 2013/0286181 | A1* | 10/2013 | Betzig ..................... H04N 7/18 348/79 |
| 2016/0291304 | A1* | 10/2016 | Singer .................... G02B 21/08 |
| 2018/0088308 | A1 | 3/2018 | Liu et al. |
| 2018/0164567 | A1 | 6/2018 | Chan |
| 2020/0284715 | A1* | 9/2020 | Kalkbrenner ...... G02B 21/0032 |

OTHER PUBLICATIONS

Azaripour, Adriano, et al., "A survey of clearing techniques for 3D imaging of tissues withspecial reference to connective tissue", Progress in Histochemistry and Cytochemistry 51; www.elsevier.de/proghi, Apr. 2016, pp. 9-23.

Chhetri, Raghav, et al., "Whole-animal functional and developmental imaging with isotropic spatial resolution", Nature Methods, vol. 12, No. 12, Dec. 2015, pp. 1171-1178.

Fahrbach, Florian, et al., "Rapid 3D light-sheet microscopy with a tunable lens", Optics Express 21010; vol. 21, No. 18, Sep. 9, 2013, 17 pages.

Gao, Liang, "Extend the field of view of selective plan illumination microscopy by tiling the excitation light sheet", Optics Express 6102; vol. 3, No. 5, Feb. 26, 2015, 10 pages.

Glaser, Adam K, et al., "Light-sheet microscopy for slide-free non-destructive pathology of large clinical specimens", Nature Biomedical Engineering vol. 1, Article No. 0084, Jun. 26, 2017, 10 pages.

Huisken, Jan, et al., "Optical Sectioning Deep Inside Live Embryos by Selective Plane Illumination Microscopy", www.sciencemag.org; Science vol. 305, Aug. 13, 2004, pp. 1007-1010.

Hulsken, Jan, et al., "Selective plane illumination microscopy techniques in developmental biology", Development 136 (12), 2009, pp. 1963-1975.

Kino, Gordon S, "Applications and theory of the solid immersion lens", SPIE 3609, Optical Pulse and Beam Propagation; https://www.spiedigitallibrary.org/conference-proceedings-of-spie, Jun. 3, 1999, 12 pages.

Mansfield, S M, et al., "Solid immersion microscope", Applied Physics Letters; 57, 2615 (1990); https://doi.org/10.1063/1.103828, Oct. 1, 1990, pp. 2615-2616.

McGorty, Ryan, et al., "High-NA open-top selective-plane illumination microscopy for biological imaging", Optical Society of America; Optics Express 17800, vol. 25, No. 15; https://doi.org/10.1364/OE.25.017798, Jul. 24, 2017, 13 pages.

McGorty, Ryan, et al., "Open-top selective plane illumination microscope for conventionally mounted specimens", Optics Express 16142; vol. 23, No. 12, Jun. 15, 2015, 12 pages.

Mickoleit, Michaela, et al., "High-resolution reconstruction of the beating zebrafish heart", Nature Methods, vol. 11 No. 9, Sep. 2014, pp. 919-922.

Royer, Loic A, et al., "Advative light-sheet microscopy for long-term, high-resolution imaging in living organisms", Nature Biotechnology, vol. 34 No. 12, Dec. 2016, pp. 1267-1278.

Weber, Michael, et al., "Light sheet micros copy for real-time developmental biology", Current Opinion in Genetics & Development 2011; www.sciencedirect.com, 2011, pp. 566-572.

First Office Action dated Jul. 5, 2022 for CN Application No. 202080014876.5.

Extended European Search Report dated Sep. 12, 2022 for EP Application No. 20741024.2.

Barner, Lindsey A., et al., "Solid Immersion Meniscus Lens (Simlens) for Open-Top Light-Sheet Microscopy", Optics Letters, vol. 44, No. 18, Sep. 2019, 4 pgs.

\* cited by examiner

APPARATUSES, SYSTEMS AND METHODS FOR SOLID IMMERSION MENISCUS LENSES

CROSS-REFERENCE TO RELATED APPLICATION(S)

The present application is a continuation application of U.S. application Ser. No. 17/356,135, filed Jun. 23, 2021, issued as U.S. Pat. No. 11,287,633 on Mar. 29, 2022, which is a continuation application of International Patent Application No. PCT/US2020/013512, filed Jan. 14, 2020, which claims the benefit under 35 U.S.C. § 119 of the earlier filing date of U.S. Provisional Application Ser. No. 62/792,138 filed Jan. 14, 2019, the entire contents of which is hereby incorporated by reference in their entirety for any purpose.

STATEMENT REGARDING RESEARCH & DEVELOPMENT

This invention was made with government support under K99 CA240681 awarded by the NIH; W81XW H-18-10358 awarded by the Department of Defense, Congressionally Directed Medical Research Programs (CDMRP), Prostate Cancer Research Program (PCRP); and a Graduate Research Fellowship Award awarded by the National Science Foundation (NSF). The government has certain rights in the invention.

TECHNICAL FIELD

Embodiments of the invention relate generally to optical imaging, and particularly to microscopy.

BACKGROUND

Microscopy may generally involve directing light onto a sample, and then imaging the sample based on light received from the sample. Some microscopes place the optics of the system on an opposite (bottom) side of a sample holder relative to the sample. This may improve access to the sample, ease of preparing/mounting the sample, etc. Accordingly, the illumination light and the collection light may pass through the material of the sample holder to pass between the optics and the sample. It may be difficult to couple light into/out of the sample without distorting the image due to various aberrations such as those due to differences in index of refraction between the ambient environment where the objectives are located and the index of refraction of the sample holder.

SUMMARY

In at least one aspect, the present disclosure relates to an apparatus which includes a sample holder, an immersion chamber, an illumination objective lens, a collection objective lens, a first solid immersion meniscus lens, and a second solid immersion meniscus lens. The sample holder has a first side configured to support a sample and a second side opposite the first side. The immersion chamber holds an immersion fluid and a second side of the sample holder is adjacent to the immersion fluid. The illumination objective lens is positioned outside the immersion fluid and has a focal region within the sample. The collection objective lens is positioned outside the immersion fluid and has a focal region within the sample. The first solid immersion meniscus lens (SIMlens) is positioned between the illumination objective lens and the immersion fluid. The second SIMlens is positioned between the collection objective lens and the immersion fluid and is independent of the first SIMlens. Each SIMlens has a first surface and second surface opposite the first surface and a second surface is adjacent to the immersion fluid. Light passing between the objective lens and the focal region is approximately normal to the first surface and the second surface of each of the SIMlenses.

The first surface and the second surface of the first SIMlens and the second SIMlens may each curved to match a wavefront of the light passing through the SIMlens. The first surface of the first SIMlens may have a first curvature, the second surface of the first SIMlens may have a second curvature, the first surface of the second SIMlens may have a third curvature, and the second surface of the second SIMlens may have a fourth curvature, and the first, the second, the third, and the fourth curvatures may not equal to each other.

The first surface of each of the first SIMlens and the second SIMlens may have a radius of curvature of the distance from the first surface to the focal region and the second surface of each of the first SIMlens and the second SIMlens may have a radius of curvature of the distance from the second surface to the focal region. The first surface of the first SIMlens may have a first radius of curvature, the second surface of the first SIMlens may have a second radius of curvature, the first surface of the second SIMlens may have a third radius of curvature, and the second surface of the second SIMlens may have a fourth radius of curvature and the first, the second, the third, and the fourth radii of curvature may not be equal to each other.

The apparatus may include an actuator which may move the sample holder in three dimensions with respect to the immersion chamber. The apparatus may include a source which may produce illumination light. The first objective lens may be configured to direct the illumination light as an illumination beam towards the focal region. A detector may receive collected light and the second objective lens is may receive light from the focal region. The objective lens may have a first optical axis and the second objective lens may have a second optical axis. The first optical axis may be orthogonal to the second optical axis. The apparatus may include a lens turret which may hold the objective lens and at least one additional objective lens. The lens turret may selectably position one of the objective lens and the at least one additional objective lens along an optical path including the focal region.

In at least one aspect, the present disclosure relates to an apparatus including a sample holder, an immersion chamber, a first objective lens, a second objective lens, and a solid immersion meniscus lens (SIMlens). The sample holder has a first side configured to support a sample and a second side opposite the first side. The immersion chamber holds an immersion fluid. The second side of the sample holder is adjacent to the immersion fluid. The first objective lens is positioned outside the immersion fluid in an ambient environment and focuses light on a focal region of the sample. The second objective lens is positioned outside the immersion fluid in the ambient environment and focuses light on the focal region of the sample. The SIMlens is positioned between the first objective lens and the immersion fluid, but not between the second objective lens and the immersion fluid. The ambient environment has a first index of refraction, the SIMlens has a second index of refraction different than the first index of refraction, and the sample, sample holder, and immersion fluid have a third index of refraction different than the first and the second index of refraction.

The ambient environment may be air, and the first objective lens may be an air objective. The SIMlens may have a first curved surface and a second curved surface opposite the first curved surface. The first curved surface and the second curved surface may be shaped to match a wavefront of light passing between the sample and the first objective lens. The first curved surface may have a radius of curvature of a distance between the first curved surface and a focal region of the objective lens, and the second curved surface may have a radius of curvature of a distance between the second curved surface and the focal region. The second objective lens may be an immersion objective in contact with the immersion fluid.

The apparatus may also include a second SIMlens positioned between the second objective lens and the immersion fluid. The second SIMlens may be independent of the first SIMlens. The second SIMlens may have the second index of refraction. The first objective lens may direct an illumination beam towards a focal region of the sample and the second objective lens may collect light from the focal region.

In at least one aspect, the present disclosure relates to a method. The method includes directing illumination light along an illumination path through a first objective lens and towards a sample, where the illumination light passes through an immersion fluid, passes through a sample holder and enters the sample. The method includes receiving collected light from the sample at a second objective lens along a collection path, wherein the received light passes through the sample holder, the immersion fluid, and a solid immersion meniscus lens (SIMlens). The SIMlens has a first curved surface and a second curved surface each configured to match a wavefront of the collected light. The second curved surface is adjacent to the immersion medium. The illumination light does not pass through the SIMlens.

The illumination path may include a second SIMlens positioned between the first objective lens and the immersion fluid. The method may also include matching a refractive index of the immersion fluid to a refractive index of the sample. The method may also include imaging the sample based on the collected light. The sample holder may have a first side which may support the sample and a second side opposite the first side, the second side may be adjacent to the immersion fluid. The method may further include scanning the sample holder along an axis from the first side to the second side to generate a depth stack of images.

DETAILED DESCRIPTION

Figure 1:
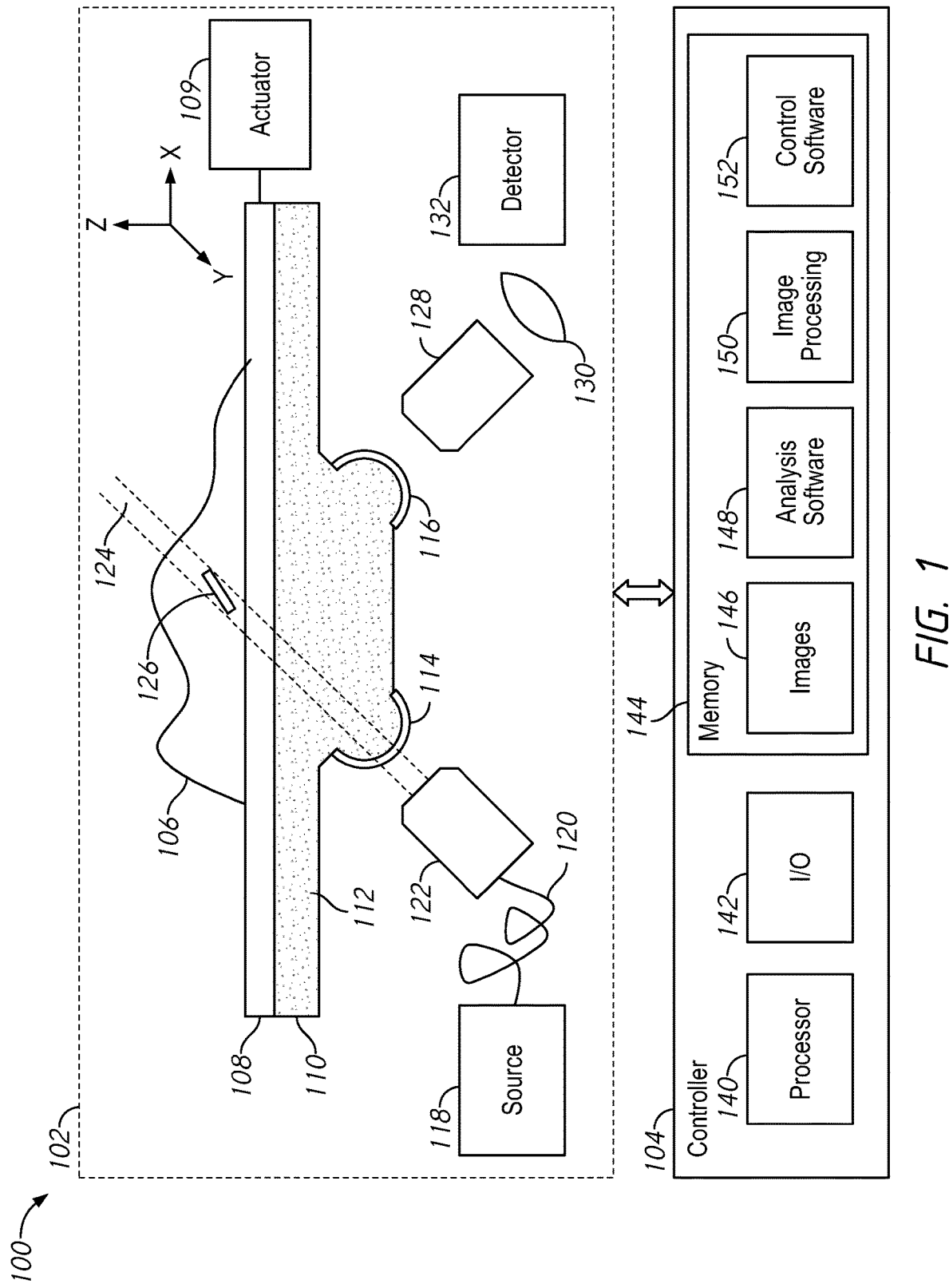
FIG. 1 is a block diagram of an open top microscope with a solid immersion meniscus lens according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Various example values are given throughout the specification. It should be understood that these values are approximate, as perfect alignment may not be possible in a real-world system. Thus values such as 'normal' or 'orthogonal' should be interpreted as "approximately 90°" where the actual value may be within a tolerance of the desired angle. For example, two things which are described as orthogonal may be positioned anywhere from 85-95° with respect to each other. Other angles and measurements should be interpreted in a similar manner.

Microscopy may be used in a wide array of applications to produce images of a sample, usually with a field of view and/or resolution which are not normally visible to the naked eye. Illumination light may be directed onto a sample with illumination optics. Collection optics may be used to collect light from the sample onto a detector (for example, a CCD detector, a CMOS detector, or a user's eyes). In some instances, the light which reaches the detector may include a portion of the illumination light. In some instances, the light which reaches the detector may be emitted from the sample (e.g., via fluorescence) after being stimulated to emission by the illumination light. It may be desirable to ensure that the field of view receives even illumination and to ensure that the illumination penetrates the depth of the sample.

Light sheet microscopy achieves both even illumination and optical sectioning (rejection of out-of-focus light) by exciting fluorescence along a thin 2D illumination "light sheet" within a sample, which is imaged with a detector. The illumination and collection optics are decoupled from each other each may be separately optimized to increase imaging performance. The split of the illumination and collection optics may be useful to reduce the amount of illumination light which directly reaches collection optics. This in turn, may be useful for certain types of microscopy such as fluorescence microscopy or dark field microscopy.

The illumination and/or collection optics may be arranged at an angle relative to a sample holder (e.g., a transparent plate supporting the sample). For example, the illumination and collection optics may each be at a 45° angle relative to the sample holder. While this may offer advantages for optimization of imaging parameters and depth of imaging, the non-normal incidence of the illumination and/or collection light with the sample holder may lead to various aberrations. A solid immersion lens (SIL) may include a surface which matches a wavefront of the illumination or collection light, such that light rays into or out of the sample meet the SIL at a normal angle. However, the use of an SIL may offer limitations, such as a need to match the refractive index of the sample to the refractive index of the SIL, or limited movement of the sample holder relative to the SIL to maintain the geometry of the illumination and collected light through the SIL relative to the sample holder and sample.

The present disclosure is directed to a solid immersion meniscus lens (SIMlens). A microscope may have a sample holder with a first side and a second side. The first side may support a sample, while the second side is in contact with an immersion medium (e.g., an immersion fluid). An objective, such as a collection or illumination objective, may be located on the second side of the sample holder. A SIMlens may be positioned between the objective and the immersion medium, such that a first curved surface of the SIMlens is in contact with the immersion medium, while a second curved surface of the SIMlens is not (e.g., the other side may be in contact with the air). The first and second curved surfaces of the SIMlens may be shaped to match a wavefront of the light passing across that surface. For example, the first and second curved surface may be shaped such that light rays (e.g., along an illumination or collection path) cross the material of the SIMlens normal to the surface of the SIMlens. This may reduce the refraction as light passes from the ambient environment which includes the objective and into the immersion fluid. In some embodiments, the sample, sample holder, and immersion medium may have a same index of refraction, while the material of the SIMlens may have a different index of refraction. The use of the SIMlens may allow for the use of a SIMlens material which does not need to be matched to the immersion material/sample, and may facilitate three dimensional movement of the sample holder relative to the SIMlens.

FIG. 1 is a block diagram of an open top microscope with a solid immersion meniscus lens according to some embodiments of the present disclosure. FIG. 1 shows an optical system 100 which includes an open top microscope 102 and an optional controller 104 which may operate the microscope 102 and/or interpret information from the microscope 102. In some embodiments, one or more parts of the controller 104 may be omitted, and the microscope 102 may be operated manually. In some embodiments, one or more parts of the controller 104 may be integrated into the microscope 102.

The microscope 102 includes a sample holder 108 which supports a sample 106 along a top side of the sample holder 108. A bottom surface of the sample holder 108 is in contact with an immersion fluid 112, which is contained within an immersion chamber 110. The microscope 102 of FIG. 1 has an illumination path and collection path which are separate from each other. The illumination path include a source 118, illumination optics 120, and an illumination objective 122. The illumination path provides an illumination beam 124 which passes through the immersion medium 112 and sample holder 108 to illuminate the sample 106. The collection path includes a collection objective 128, collection optics 130, and a detector 132. The collection path may collect light from a focal region 126 which is illuminated by the illumination beam 124.

A solid immersion meniscus lens (SIMlens) may be positioned along the illumination and/or collection path. In the embodiment of FIG. 1, an illumination SIMlens 114 is shown as part of the illumination path, and a collection SIMlens 116 is shown as part of the collection path. The SIMlenses 114 and 116 may be shaped to prevent the refraction of light passing along the illumination or collection paths respectively as it passes between the immersion fluid 112, material of the SIMlens 114 or 116 and ambient environment of the microscope 102. In some embodiments, a single SIMlens may be used as part of the illumination path (e.g., similar to the illumination SIMlens 114) while no SIMlens is used as part of the collection path. In some embodiments, a single SIMlens may be used as part of the collection path (e.g., similar to the collection SIMlens 116) while no SIMlens is used as part of the illumination path.

The source 118 provides illumination light along the illumination path to illuminate a focal region 126 of a sample 106. The source 118 may be a narrow band source, such as a laser or a light emitting diode (LED) which may emit light in a narrow spectrum. In some embodiments, the light may be a broadband source (e.g., an incandescent source, an arc source) which may produce broad spectrum (e.g., white) illumination. In some embodiments, one or more portions of the illumination light may be outside of the visible range. In some embodiments, a filter (not shown) may be used as part of the illumination path to further refine the wavelength(s) of the illumination light. For example, a bandpass filter may receive broadband illumination from the source 118, and provide illumination light in a narrower spectrum. In some embodiments, the light source 103 may be a laser, and may generate collimated light.

In some embodiments, the optical system 100 may be used to image fluorescence in the sample 106. The illumination beam 124 may include light at a particular excitation wavelength, which may excite flourophores in the sample 106. The illumination beam 124 may include a broad spectrum of light which includes the excitation wavelength, or may be a narrow band centered on the excitation wavelength. In some embodiments, the light source 118 may produce a narrow spectrum of light centered on (or close to) the excitation wavelength). In some embodiments, filter(s) (not shown) may be used in the illumination optics 120 to limit the illumination beam 124 to wavelengths near the excitation wavelength. Once excited by the illumination sheet, the fluorophores in the sample 106 may emit light (which may be centered on a given emission wavelength). The collection path (e.g., collection optics 130) may include one or more filters which may be used to limit the light which reaches the detector 132 to wavelengths of light near the emission wavelength.

The illumination optics 120 may couple the light from the source 118 to the illumination objective 122. For example, the illumination optics 120 may include an optical fiber which carries light from the source 118 to aback end of the illumination objective 122. In some embodiments, the illumination optics 120 may couple the light between the source 118 and the objective 122 without substantially altering the light provided by the source 118. In some embodiments, the illumination optics 120 may alter the shape, wavelength, intensity and/or other properties of the light provided by the source 118. For example, the illumination optics 120 may receive broadband light from the source 118 and may filter the light (e.g., with a filter, diffraction grating, acousto-optic modulator, etc.) to provide narrow band light to the objective 122.

In some embodiments, the illumination path may provide an illumination beam 124 which is a light sheet as part of light sheet micrsocopy or light-sheet fluorescent microscopy (LSFM). The light sheet may have a generally elliptical cross section, with a first numerical aperture along a first axis (e.g., the y-axis) and a second numerical aperture greater than the first numerical aperture along a second axis which is orthogonal to the first axis. The illumination optics 120 may include optics which reshape light received from the source 118 into an illumination sheet. For example, the illumination optics 120 may include one or more cylindrical optics which focus light in one axis, but not in the orthogonal axis.

In some embodiments, the illumination optics 120 may include scanning optics, which may be used to scan the illumination beam 124 relative to the sample 106. For example, the region illuminated by the illumination beam may be smaller than the desired focal region 126. In this case, the illumination optics 120 may rapidly oscillate the illumination beam 124 across the desired focal region 126 to ensure illumination of the focal region 126.

The illumination objective 122 may include one or more lenses which provide the illumination beam 124. For example, the illumination objective 122 may focus the illumination beam 124 towards the focal region 126. The sample holder 108 may position the sample 106 such that the focal region 126 is generally within the sample 106. The illumination objective may, in some embodiments, be a commercial objective lens which includes one or more internal optical elements. In some embodiments, the illumination objective 122 may be surrounded by an ambient environment (e.g., air), and the illumination objective 122 may be an air objective. The illumination objective 122 may be characterized by one or more numerical apertures, which may be based on the angle(s) at which light converges at the focal region 126. In some embodiments, the focal region 126 may be idealized as a focal point.

The illumination beam 124 may be directed to pass through the illumination SIMlens 114 and into the immersion fluid 112. The illumination SIMlens 114 may be shaped to minimize the refraction of light passing from the ambient environment which includes the illumination objective 122 (e.g., air) through the material of the illumination SIMlens 114 and into the immersion fluid 112. The illumination beam 124 may then pass through the immersion fluid 112 towards the sample 106 and sample holder 108. The interaction of the light with the SIMlens 114 and immersion fluid 112 is discussed in more detail in FIGS. 2-3.

The illumination beam 124 may be directed onto the sample 106. The sample 106 may be supported by an upper surface of the sample holder 108. In some embodiments, the sample 106 may be placed directly onto the upper surface of the sample holder 108. In some embodiments, the sample 106 may be packaged in a container (e.g., on a glass slide, in a well plate, in a tissue culture flask, etc.) and the container may be placed on the sample holder 108. In some embodiments, the container may be integrated into the sample holder 108. In some embodiments, the sample 106 may be processed before imaging on the optical system 100. For example, the sample 106 may be washed, sliced, and/or labelled before imaging.

In some embodiments, the sample 106 may be a biological sample. For example, the sample 106 may be a tissue which has been biopsied from an area of suspected disease (e.g., cancer). In some embodiments, the tissue may undergo various processing, such as optical clearance, tissue slicing, and/or labeling before being examined by the optical system 100. In some embodiments, examination of the tissue with the optical system 100 may be used for diagnosis, to determine treatment progress, to monitor disease progression, etc.

In some embodiments, the sample 106 may be non-biological. For example, the sample 106 may be a fluid, and may contain one or more components for investigation. For example, the sample 106 may be a combustion gas, and the optical system 106 may perform particle image velocimetry (PIV) measurements to characterize components of the gas.

In some embodiments, the sample 106 may include one or more types of flourophores. The flourophores may be intrinsic to the sample 106 (e.g., DNA and proteins in biological samples) or may be a fluorescent label (e.g., acridine orange, Eosin) applied to the sample 106. Some samples 106 may include a mix of intrinsic types of flourophores and fluorescent labels. Each type of fluorophore may have an excitation spectrum, which may be centered on an excitation wavelength. When a fluorophore is excited by light in the excitation spectrum, it may emit light in an emission spectrum, which maybe centered on an emission wavelength which is different than (e.g., red-shifted from) the excitation wavelength.

The sample holder 108 may support the sample 106 over a material which is generally transparent to illumination beam 124 and to light collected from the focal region 126 of the sample 106. In some embodiments, the sample holder 108 may have a window of the transparent material which the sample 106 may be positioned over, and a remainder of the sample holder 108 may be formed from a non-transparent material. In some embodiments, the sample holder 108 may be made from a transparent material. For example, the sample holder 108 may be a glass plate.

In some embodiments, the sample holder 108 may include one or more structures to support the sample 106. For example, the sample holder 108 may include clips or a well. In some embodiments, the sample holder 108 may be a modular component of the system 100, and different sample holders 108 may be swapped in or out depending on the type of sample, the type of imaging, the wavelengths of the illumination/collected light, and combinations thereof.

The sample holder 108 may have a second surface (e.g., a lower surface) which is opposite the surface of the sample holder 108 which supports the sample 106. An immersion chamber 110 which holds an immersion fluid 112 may be positioned below the second surface of the sample holder 108. In some embodiments, the immersion chamber 110 may have an open top, and the immersion fluid 112 may be in contact with the second surface of the sample holder 108. In some embodiments, while the second surface of the sample holder 108 may be in contact with the immersion fluid 112, the first surface of the sample holder 108 (which supports the sample 106) may be in contact with the same environment as the objectives 122 and 128 (e.g., air).

The sample holder 108 may be coupled to an actuator 109, which may be capable of moving the sample holder 108 in one or more directions. In some embodiments, the sample holder 108 may be movable in up to three dimensions (e.g., along the x, y, and z axes) relative to the immersion chamber 110 and objectives 122 and 128. The sample holder 108 may be moved to change the position of the focal region 126 within the sample 106 and/or to move the sample holder 108 between a loading position and an imaging position. In some embodiments, the actuator may be a manual actuator, such as screws or coarse/fine adjustment knobs. In some embodiments, the actuator may be automated, such as an electric motor, which may respond to manual input and/or instructions from a controller 104. In some embodiments the actuator 109 may respond to both manual adjustment and automatic control (e.g., a knob which responds to both manual turning and to instructions from the controller 104).

The immersion chamber 110 contains the immersion fluid 112. In some embodiments, the immersion chamber 110 may include a source and/or sink, which may be useful for changing out the immersion fluid 112. For example, the immersion chamber 110 may be coupled to a fluid input line (which in turn may be coupled to a pump and/or reservoir)

which provides the immersion fluid 112 and a drain which may be opened to remove the immersion fluid 112 from the immersion chamber 110. As described in more detail herein, the type of immersion fluid may be chosen based on a refractive index of the sample 106 and/or sample holder 108.

The collection path may receive light from a focal region 126 and direct the received light onto a detector 132 which may image and/or otherwise measure the received light. The light from the focal region 126 may be a redirected portion of the illumination beam 124 (e.g., scattered and/or reflected light), may be light emitted from the focal region 126 in response to the illumination beam 124 (e.g., via fluorescence), or combinations thereof. The collected light may pass through the sample holder 108 and immersion fluid 112 before passing through the collection SIMlens 116 and into the ambient environment (e.g., air) including the collection objective 128. The collection SIMlens 116 may be shaped to minimize refraction as the collected light passes through it. The interaction of light with the SIMlens is described in more detail in FIGS. 2-3. The collection SIMlens 116 may be a separate optical component than the illumination SIMlens 114. In some embodiments, the collection SIMlens 116 may be made from a different material than the illumination SIMlens 114.

The illumination SIMlens 114 and the collection SIMlens 116 may be independently shaped to match the wavefronts of the illumination beam 124 and the collected light respectively. For example, the wavefront of the illumination beam 124 may be based on the optics of the illumination path, while the wavefront of the collected light may be based on the optics of the collection path. Since the optics of the illumination and collection paths are independent from each other, the shape of the wavefronts of the illumination and collected light may be different. Since the two SIMlenses 114 and 116 may be separate optical elements, the illumination SIMlens 114 may have a shape (e.g., curvatures of the front and back surfaces) which is different than a shape (e.g., curvatures of the front and back surfaces) of the collection SIMlens 116. In this manner the illumination SIMlens 114 may have a shape based on the illumination beam 124 while the collection SIMlens 116 has a shape based on the collected light.

The geometry of the focal region 126 may be defined in part by the field of view of the collection path, which in turn may depend in part on the numerical aperture of the collection objective 128. Similar to the illumination objective 122, the collection objective 128 may be a commercial objective which includes one or more lenses. In some embodiments, the collection objective 128 may be an air objective. In some embodiments, the focal region which the collection path is focused on and the focal region which the illumination path is focused on may generally overlap at the focal region 126. In some embodiments, the illumination and collection paths may have different shapes, sizes, and/or locations of their respective focal regions.

The collection path includes collection optics 130 which may redirect light from the collection objective onto the detector 132. For example, the collection optics 130 may be a tube lens designed to focus light from the back end of the collection objective into an image which is projected on the detector 132. In some embodiments, the collection optics 130 may include one or more elements which alter the light received from the collection objective 128. For example, the collection optics 130 may include filters, mirrors, de-scanning optics, or combinations thereof.

The detector 132 may be used for imaging the focal region 126. In some embodiments, the detector 132 may represent an eyepiece, such that a user may observe the focal region 126. In some embodiments, the detector 132 may produce a signal to record an image of the focal region 126. For example, the detector 132 may include a CCD or CMOS array, which may generate an electronic signal based on the light incident on the array.

The illumination path may direct light along a first optical axis. The collection path may collect light along a second optical axis. In some embodiments, such as the one shown in FIG. 1, the first optical axis and the second optical axis may be orthogonal to each other. Each of the first optical axis and the second optical axis may also be non-orthogonal to the sample holder. For example, the first optical axis may be at a 450 angle with respect to the bottom surface of the sample holder 108 and the second optical axis may also be at a 450 angle with respect to the bottom surface of the sample holder 108.

In some embodiments, the illumination and collection paths may be non-orthogonal to each other. For example, the illumination path may follow a first optical axis which is at a 45° angle with respect to the bottom surface of the sample holder, while the collection path may follow a second optical axis which is at a 90° angle with respect to the bottom surface of the holder. Accordingly, there may be about a 45° angle between the first and the second optical axes.

In some embodiments, one of the objectives 122 and 128 may be an air objective, while the other objective may be a non-air objective (e.g., an immersion objective). The non-air objective may, in some embodiments, be immersed (or have a front surface in contact with) the immersion fluid 112. In some embodiments, the air objective may have a SIMlens positioned between the objective and the immersion fluid, while a SIMlens may not be used with the non-air objective. For example, the illumination objective 122 may direct an illumination beam 124 through an illumination SIMlens 114 and into an immersion fluid 112, while the collection objective 128 may be adjacent to (e.g., in contact with) the immersion fluid 112.

The microscope 102 may be coupled to a controller 104 which may be used to operate one or more parts of the microscope 102, display data from the microscope 102, interpret data from the microscope 102, or combinations thereof. In some embodiments, the controller 104 may be separate from the microscope, such as a general purpose computer. In some embodiments, one or more parts of the controller 104 may be integral with the microscope 102.

The controller 104 includes one or more input/output devices 142, which may allow a user to view feedback from the controller 104, data from the microscope 102, provide instructions to the controller 104, provide instructions to the microscope 102, or combinations thereof. For example, the input/output device 142 may include a digital display, a touchscreen, a mouse, a keyboard, or combinations thereof.

The controller 104 includes a processor 140, which may execute one or more instructions stored in a memory 144. Instructions may include control software 152, which may include instructions about how to control the microscope 102. Based on the control software 152, the processor 140 may cause the controller 104 to send signals to various components of the microscope 102, such as the actuator 109. Instructions may include image processing software 150, which may be used to process images 146 either 'live' from the detector 132 or previously stored in the memory 144. The image processing software 150 may, for example, remove background noise from an image 146. Instructions may include analysis software 148, which may be executed by the processor 140 to determine one or more properties of the images 146. For example, the analysis software 148 may highlight cell nuclei in an image 146.

In some embodiments, the controller 104 may direct the microscope to collect images from a number of different fields of view in the sample. For example, the controller 104 may include instructions to collect a depth stack of images. The controller 104 may direct the detector 132 to collect a first image, and then instruct the actuator 109 to move the sample holder 108 a set distance in a vertical direction (e.g., along the z-axis). This may also move the sample 106 relative to the focal region 126 which may change the height within the sample at which the focal region 126 is located. The controller 104 may then instruct the detector 132 to collect another image and then repeat the process until a set number of images in the stack and/or a set total displacement in the z-direction have been achieved. The analysis software 148 may then combine the depth stack of images to allow for 3D (or pseudo-3D) imaging of the sample 106.

Figure 2:
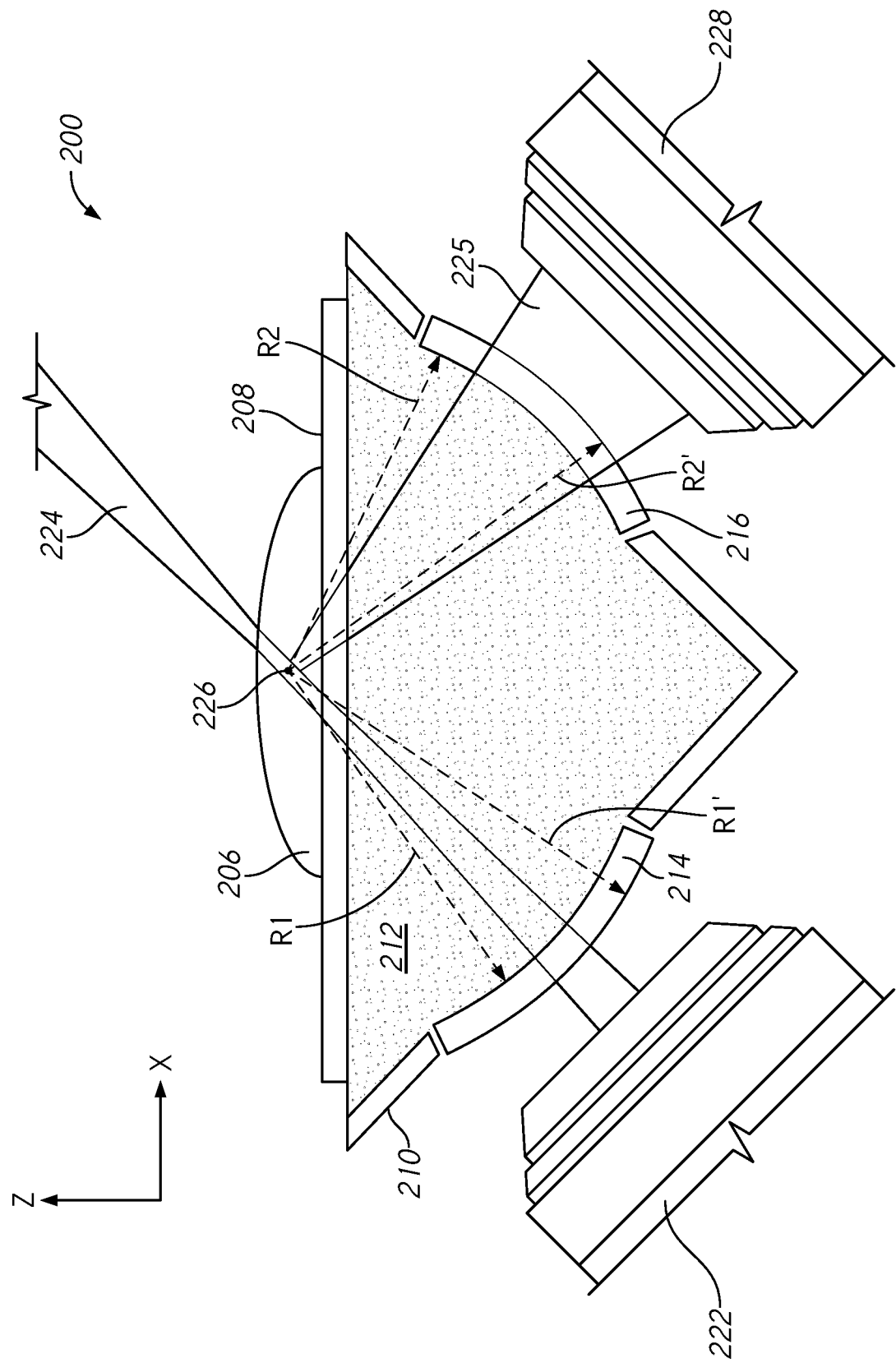
FIG. 2 is a schematic diagram of a portion of an optical system accordingly to some embodiments of the present disclosure.

FIG. 2 is a schematic diagram of a portion of an optical system accordingly to some embodiments of the present disclosure. FIG. 2 may, in some embodiments represent a portion of the microscope 102 of FIG. 1. FIG. 2 shows a view of a sample 206, sample holder 208, immersion chamber 210, immersion fluid 212, SIMlenses 214 and 216, and objectives 222 and 228.

The illumination objective 222 provides an illumination beam 224 which exits a front end of the illumination objective 222 and passes through a medium which surrounds the illumination objective 222. The medium surrounding the illumination objective 222 may be part of an ambient environment that the microscope is placed in. For example, the ambient medium may be air. After passing through the ambient medium the illumination beam passes through the illumination SIMlens 214 and into the immersion fluid 212.

The illumination SIMlens 214 may have a first curved surface and a second curved surface on an opposite side of the illumination SIMlens 214 from the first curved surface. In some embodiments, the first curved surface may be in contact with the ambient medium, while the second curved surface may be in contact with the immersion fluid. The edges of the SIMlens 214 may be affixed to the walls of the immersion chamber 210 and the SIMlens 214 may help to contain the immersion fluid 212 within the chamber 210. The SIMlens 214 may act as a window for light to pass between an outside of the immersion chamber 210 and an inside of the immersion chamber 210. The first curved surface and the second curved surface of the illumination SIMlens 214 may each be shaped to match a wavefront the illumination beam where it interfaces with the illumination SIMlens 214.

For example, the illumination beam 224 may be considered as a bundle of rays which are emitted across the surface of the illumination objective and converge towards the focal region 226. The first curved surface may be shaped such that each ray is normal to the first curved surface (e.g., has a 90° angle of incidence) at the point where that ray is incident upon the first curved surface. The second curved surface may be similarly shaped. In this manner, the illumination beam may not refract (or may have a minimal amount of refraction) as it passes through the illumination SIMlens 214. An example shape for a SIMlens is discussed in more detail in FIG. 3.

Since the illumination beam 224 undergoes no (or minimal) refraction when passing from the ambient medium (e.g., air) and through the material of the SIMlens 214, the illumination beam 224 may enter the immersion fluid with minimal refraction or aberration. The illumination path may be relatively insensitive to differences between the refractive index of the SIMlens 214 material and the refractive index of the immersion fluid 212. In some embodiments, the illumination path may be 'off axis' compared to the sample holder. In other words, the optical axis of the illumination beam may be non-normal to the sample holder 208. The immersion fluid 212 may be chosen such that the index of refraction of the immersion fluid 212 matches the index of refraction of the material of the sample holder 208. In this manner, even though the illumination beam is not normal to the surface of the sample holder, there is no (or minimal) refraction as the illumination beam 224 passes from the immersion fluid 212 into the material of the sample holder 208. The material of the sample holder 208, in turn, may match an index of refraction of the sample 206, so the illumination beam 224 may also experience minimal refraction when passing from the material of the sample holder 208 into the sample 206.

In some embodiments, the material of the sample holder 208 and the immersion fluid 212 may be chosen to match the refractive index of a desired sample 206. Since the sample holder 208 may be modular, and since it may be relatively easy to fill the immersion chamber 210 with different immersion fluids, a wide range of refractive indices of the sample 206 may be accommodated. In some embodiments, one or more processing steps may be performed on the sample 206, to cause its refractive index to match a refractive index of the sample holder 208.

The illumination beam 224 may be focused to a focal region within the sample 206. Light from the illuminated focal region 226 such as reflected light, scattered light, emitted light, or combinations thereof, may be collected by the collection path. Similar to the illumination path, there may be minimal diffraction or aberration along the collection path to the collection objective 228 due to the index matching of the sample 206, sample holder 208, and immersion fluid 212, and due to the wavefront matching curvature of the collection SIMlens 216. For example, as light transitions from the sample 206 to the sample holder 208, although the light may not be normal to the interface, the similar indices of refraction may prevent diffraction of the light. In a similar fashion, the light may also not diffract as it passes from the material of the sample holder 208 into the immersion fluid 212.

The collection objective 228 may collect light across a range of angles, which may be thought of as a collected light 225 including a bundle of rays converging towards a focal region of the collection objective 228. Accordingly, the collected light 225 which is collected by the collection objective 228 may be light which passes along this bundle of rays. The collection objective 228 may be characterized by its magnification and/or numerical aperture (NA). For example, the collection objective 228 may be a 10× objective (NA=0.21) or a 20× objective (NA=0.35).

Similar to the illumination SIMlens 214, the collection SIMlens 216 may have a first curved surface and a second curved surface, each of which may be shaped to match a wavefront of the collected light 225. For example the first curved surface and the second curved surface may be shaped such that light rays of the collected light incident at each of the surfaces are normal to the surfaces of the collection SIMlens 216. In this manner there may be minimal refraction as the collected light passes from the immersion fluid 212 into the material of the collection SIMlens 216 and from the material of the collection SIMlens 216 into the ambient environment which contains the collection objective 228.

In some embodiments, the collection SIMlens 216 may have a refractive index matched to the refractive index of the illumination SIMlens 214. In some embodiments, the two SIMlenses 214 and 216 may have different refractive indices from each other. The curvature of the two surfaces of each of the SIMlenses 214 and 216 may be based on the wavefronts of the illumination and collected light respectively, which may in turn be based on the optics of the illumination and collection objectives 222 and 228. For example a numerical aperture may be used to characterize the illumination objective 222 and the collection objective 228. In some embodiments, the illumination objective 222 and the collection objective 228 may have different numerical apertures from each other, and accordingly, the curvatures of the illumination SIMlens 214 may be different from the curvatures of the collection SIMlens 216.

Figure 3:
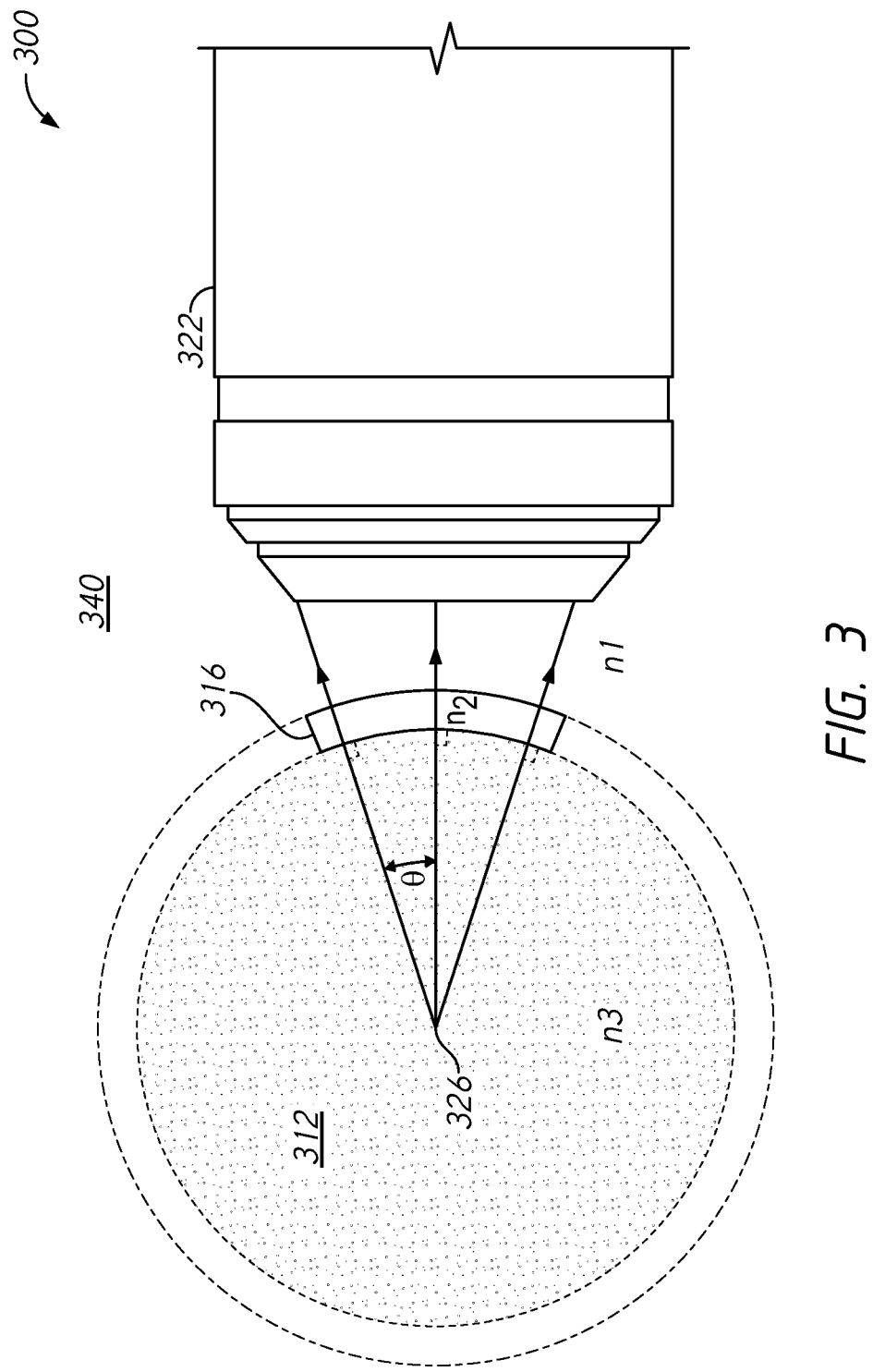
FIG. 3 is a schematic diagram of light paths through an optical system according to some embodiments of the present disclosure.

FIG. 3 is a schematic diagram of light paths through an optical system according to some embodiments of the present disclosure. FIG. 3 shows a portion of an optical system 300 which may be included in the optical system 100 of FIG. 1 and/or 200 of FIG. 2. The optical system 300 of FIG. 3 is divided into regions based on an index of refraction that light may encounter between an objective 322 and a focal region 326. In particular, since light is drawn as coming from the focal region 326 and entering the objective 322, the objective 322 as shown in FIG. 3 may be a collection objective (e.g., 122 of FIG. 1 and/or 222 of FIG. 2). It should be understood that since optics are generally reversible, the principles described in regards to FIG. 3 may be also be applied in an analogous manner to an illumination beam and illumination objective.

The objective lens 322 is located in a first medium 340, which has a first refractive index $n_1$. The SIMlens 316 is made of a material which has a second index of refraction $n_2$. The SIMlens 316 separates the first medium 340 from a region 312 which has a third index of refraction $n_3$. Collected light may come from the focal region 326 which is within the region 312, pass through the SIMlens 316 into the first medium 340 and then enter the objective 322. For ease of representation, the focal region 326 is shown as a focal point, however it should be understood that in some embodiments a non-point focal region may be used.

The region 312 may represent multiple components of an optical system which have a same (or similar) index of refraction. For example, the region 312 may represent an immersion fluid, sample holder, and sample. Since these components may generally have the same index of refraction (or their indices may be similar), light may not generally refract a meaningful amount when passing between these materials. For the sake of clarity, these components have been shown as a single region 312.

Three light rays are used to represent the collected light which is provided by the focal region 326 and enters the objective lens 322. A central ray is shown extending from the focal region 326 to a center of the objective 322, and two peripheral rays are shown extending from the focal region 326 to a furthest point on the edge of the objective 322 which receives light. In the embodiment of FIG. 3, the objective 322 may have radial symmetry (e.g., by generally circular), and so the divergence between the central ray and the peripheral rays may be characterized by an angle θ.

The objective may be defined by its numerical aperture NA, which may be given by equation 1, below:

$$NA = n*\sin(\theta) \qquad \text{Eqn. 1}$$

The first medium 340 may represent an ambient environment that the optical system 300 is located in. For example, the first medium 340 may represent the air in a room that the optical system 300 is located in. In embodiments where the first medium 340 is air, the first refractive index $n_1$ may be about 1. The objective may be an air objective, and it may come with a specified NA based on being surrounded by air, as given by equation 2, below:

$$NA_{air} = n_1*\sin(\theta) \qquad \text{Eqn. 2}$$

Since n1 may be about 1, the NAair of the objective may be based on the angle θ. However, the effective numerical aperture NAeff of the objective may be based on the interaction of the light with the focal region 326, which may be expressed by Equation 3, below:

$$NA_{eff} = n_3*\sin(\theta) \qquad \text{Eqn. 2}$$

Since the index of refraction of the region 312 may generally be greater than the index of refraction of the medium 340 (e.g., $n_3 > n_1$), the effective numerical aperture may be increased compared to specified numerical aperture of the objective. This may lead to increased performance, such as increase imaging resolution compared to if the focal region 326 was located in a region with the same refractive index as the medium 340.

In some embodiments, an immersion fluid 312 may be chosen with an index of refraction $n_3$ of between about 1 and 1.56. For example, using air as the immersion fluid may give an index of refraction of about 1, water may give an index of refraction of about 1.33 and ethyl cinnamate may give an index of refraction of about 1.56. In some examples, materials may be mixed to achieve different indices of refraction in the immersion fluid. For example, an index of about 1.33 may be water alone, an index of about 1.44 may be 60% TDE (2,2'-Thiodiethanol)/40% water, and an index of about 90% may be from 90% TDE/10% water.

The SIMlens 316 may be curved such that the light rays traveling between the focal region 326 and the objective 322 do not refract as they pass from the region 312 into the material of the SIMlens 316 or when they pass from the material of the SIMlens 316 into the medium 340. A first surface of the SIMlens 316 may be located in contact with the medium 340, while a second surface of the SIMlens opposite the first surface may be located in contact with the region 312 (e.g., in contact with the immersion fluid).

In the embodiment of FIG. 3, which shows a focal point as the focal region 326 (or a focal region small enough compared to the distance to the objective 322 that it may be considered as a point), the SIMlens 316 may have surfaces which follow the curvature of sphere. For example, the second surface may have a radius of curvature R which is the distance from the focal point to the second surface of the SIMlens 316. The first surface may have a radius of curvature R' which is the distance from the focal point to the first surface of the SIMlens 316. The distances R and R' may differ by the thickness of the SIMlens 316. For example, if the SIMlens 316 is 2 mm thick, and the first surface is 17 mm from the focal region, then the first surface may have a radius of curvature of 17 mm and the second surface may have a radius of curvature of 15 mm. In some embodiments, the focal region may not be an exact point, and so the radii of curvature (e.g., the distances) may be chosen in part to make the radii of curvature large compared to the field of view, which in turn may reduce the effect of aberration from diffraction of light which is not from the exact focal point.

Since the radius of curvature of each surface is based on a distance to the focal region 326, the light rays extending from the focal region 326 may follow radii of the curved surfaces, and may intersect the surfaces at a 900 angle. Since the angle of incidence of the light rays may be normal to the surface across the working area of both surfaces of the SIMlens 316 there may be minimal refraction of the light as it passes into and out of the material of the SIMlens 316.

In embodiments where the objective has radial symmetry (e.g., is circular) the SIMlens 316 may be a portion of a spherical shell. In some embodiments, the surfaces of the SIMlens 316 may have more complicated geometry based on the cross section of the light passing through the SIMlens 316, which turn may be based on the optical path with provides/collects the light. For example, if the light is part of a light sheet, where a numerical aperture along a first axis is different than a numerical aperture along a second axis which is orthogonal to the first axis, then the surfaces of the SIMlens 316 may follow the shape of an ellipsoid rather than a sphere.

In some embodiments, an optical system may include more than one SIMlens (e.g., an illumination SIMlens and a collection SIMlens) which may be separately optimized and shaped. For example, a first SIMlens may have a first surface which is a first distance R1 from the focal region, and a second surface which is a second distance R1' from the focal region. The second SIMlens may have a first surface which is a third distance R2 from the focal region and a second surface which is a fourth distance R2' from the focal region. At least one pair of distances may not match each other (e.g., R1≠R2 and/or R1'≠R2'). Accordingly, if none of the distances are equal to each other, the first surface of the first SIMlens may have a first radius of curvature, the second surface of the first SIMlens may have a second radius of curvature, the first surface of the second SIMLens may have a third radius of curvature, and the second surface of the second SIMLens may have a fourth radius of curvature. The first, second, third, and fourth radii of curvature may not be equal to each other.

In some embodiments, the wavefronts of the illumination and collection light may differ in other ways, and the shapes of the first and second SIMLens may also differ accordingly. For example, the first SIMlens may be along an illumination path which uses cylindrical optics, while the second SIMlens may be along a collection path which uses circular optics. Accordingly, the first SIMlens may be generally cylindrical to match a wavefront of the illumination light, while the second SIMlens may generally be a spherical shell section. In some embodiments, the two SIMlenses may be different sizes. For example, the first SIMlens may have a first diameter, while the second SIMlens has a second diameter different than the first diameter.

Figure 4:
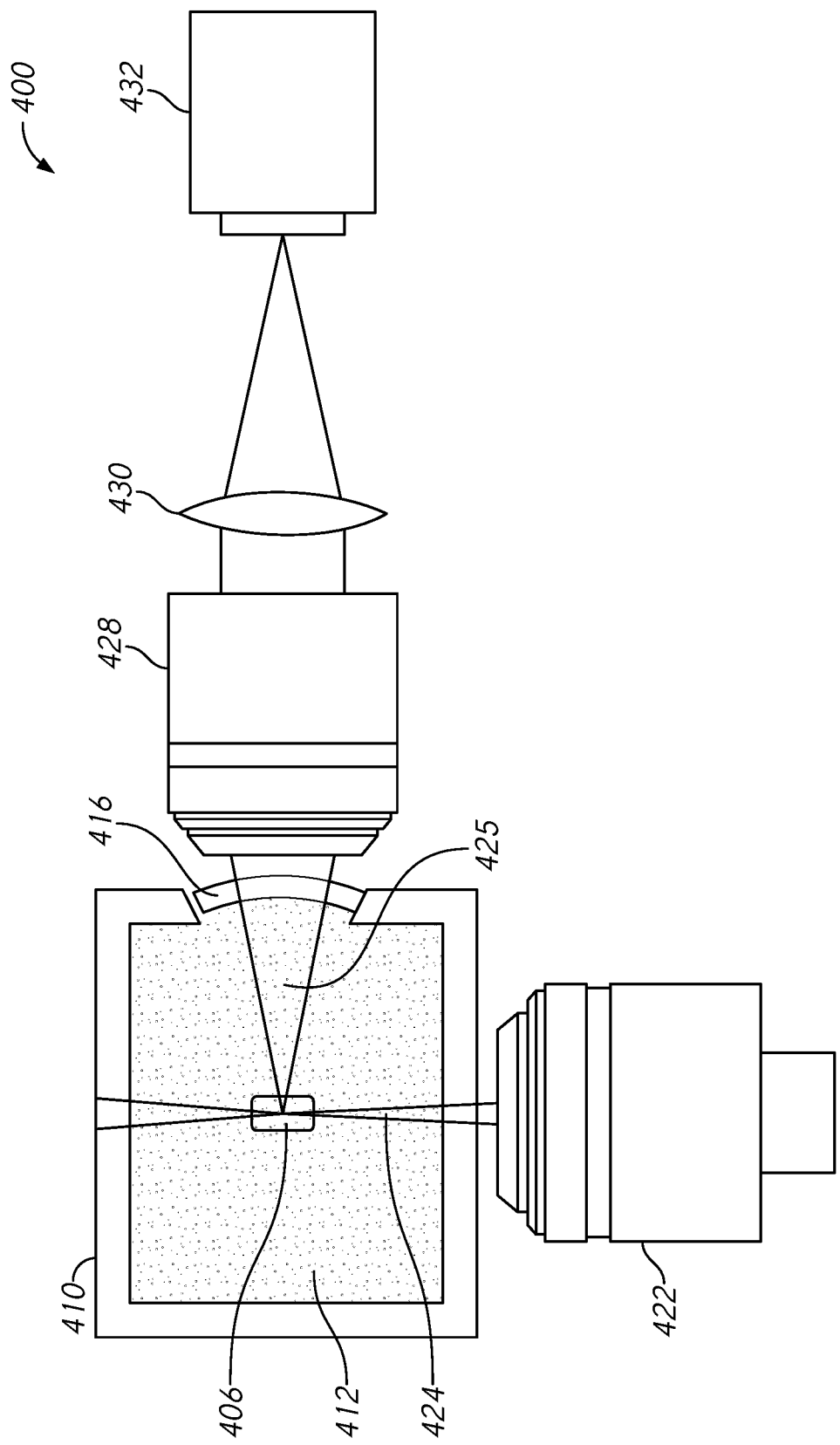
FIG. 4 is a schematic diagram of an optical system according to some embodiments of the present disclosure.

FIG. 4 is a schematic diagram of an optical system according to some embodiments of the present disclosure. The optical system 400 represents a system, which uses a SIMlens 416 along the collection path, but does not use a SIMlens along the illumination path. The optical system 400 may include components which are generally analogous to similar components in the optical system 100 of FIG. 1. For the sake of brevity, features and operations previously described with respect to FIG. 1 will not be repeated with respect to FIG. 4.

The optical system 400 includes an illumination objective 422 which directs an illumination beam 424 towards a sample 406. The sample 406 may be located within a immersion fluid 412, which is contained within an immersion chamber 410. In the embodiment of FIG. 4, the immersion beam 424 may pass through a wall of the immersion chamber 410 to reach the sample 406. The wall of the immersion chamber 410 may be transparent and/or a window may be located to allow the illumination beam 424 to pass through.

Collected light 425 from the sample 406 may pass through the immersion fluid 412 and leave the immersion chamber 410 through a SIMlens 416 which is positioned between the immersion fluid 412 and a collection objective 428. The SIMlens 416 has a first curved surface and a second curved surface opposite the first curved surface which are both shaped to match a wavefront of the collected light 425 where it crosses the SIMlens 416. Accordingly, even though there may be an index mis-match between the immersion fluid 412 and the material of the SIMlens 416 (and between the material of the SIMlens 416 and the ambient environment outside the immersion chamber 410) there may be no (or minimal) refraction of the collected light 425 as it passes through the SIMlens 416. A tube lens 430 may focus light from the collection objective 428 onto a detector 432 to produce an image of the sample 406.

Figure 5:
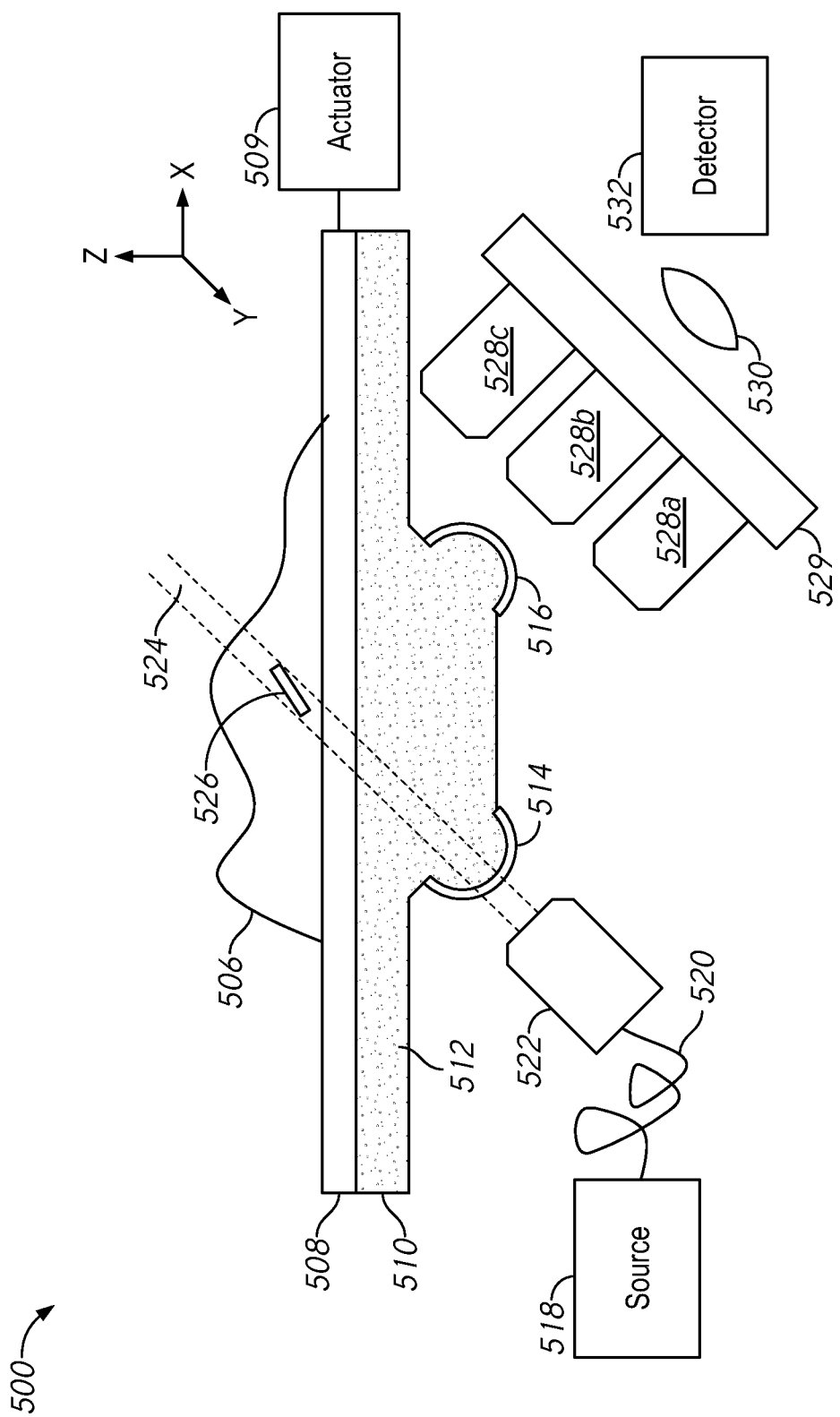
FIG. 5 is a schematic diagram of an optical system with a swappable objective mount according to some embodiments of the present disclosure.

FIG. 5 is a schematic diagram of an optical system with a swappable objective mount according to some embodiments of the present disclosure. The optical system 500 of FIG. 5 may be generally similar to the microscope 102 of FIG. 1, except that the optical system 500 has a number of collection objectives 528a-c mounted on a swappable objective mount 529. For the sake of brevity features and components previously described with respect to FIG. 1 will not be described again with respect to FIG. 5.

The optical system 500 includes a swappable objective mount 529 which has a number of objective lenses 528a-c mounted on it. For example, the objective lenses 528a-c may be commercial objective lenses, and may have standard mounting equipment, such as threading. The swappable objective mount 529 may be moved (e.g., either manually and/or automatically) to place one of the mounted objectives 528a-c along the collection path. For example, the swappable objective mount 529 may be movable between a first position, a second position, and a third position. In the first position, the objective 528a receives light from the focal region 526 (e.g., through the SIMlens 516) and provides that received light to the detector (e.g., through collection optics 530) while the objectives 528b and 528c are not along the collection path of the optical system. In the second position, the objective 528b may be along the collection path while the objectives 528a and 528c are not, and so forth. In some embodiments, the swappable objective mount may be a turret (such as a commercial microscope objective turret) which may rotate between positions. In some embodiments, the swappable objective mount 529 may have one or more 'open' positions.

Objectives with different properties may be mounted to the swappable objective mount 529 based on different imaging needs (or on expected imaging modes). For example, each of the different objectives 528a-c may have different optical properties such as numerical aperture and/or magnification. For example, a first objective 528a may be a 10× objective (NA=0.21) while a second objective 528b may be a 20× objective (NA=0.35). In some embodiments, additional optics may be included on the swappable objective mount 529, such as different filters which may be useful for imaging different fluorescent wavelengths which may be emitted by the sample. For example, a first objective 528a may have a first filter which includes an emission wavelength of a first fluorophore, a second objective 528b may have a second filter which includes an emission wavelength of a second fluorophore, etc.

Figure 6:
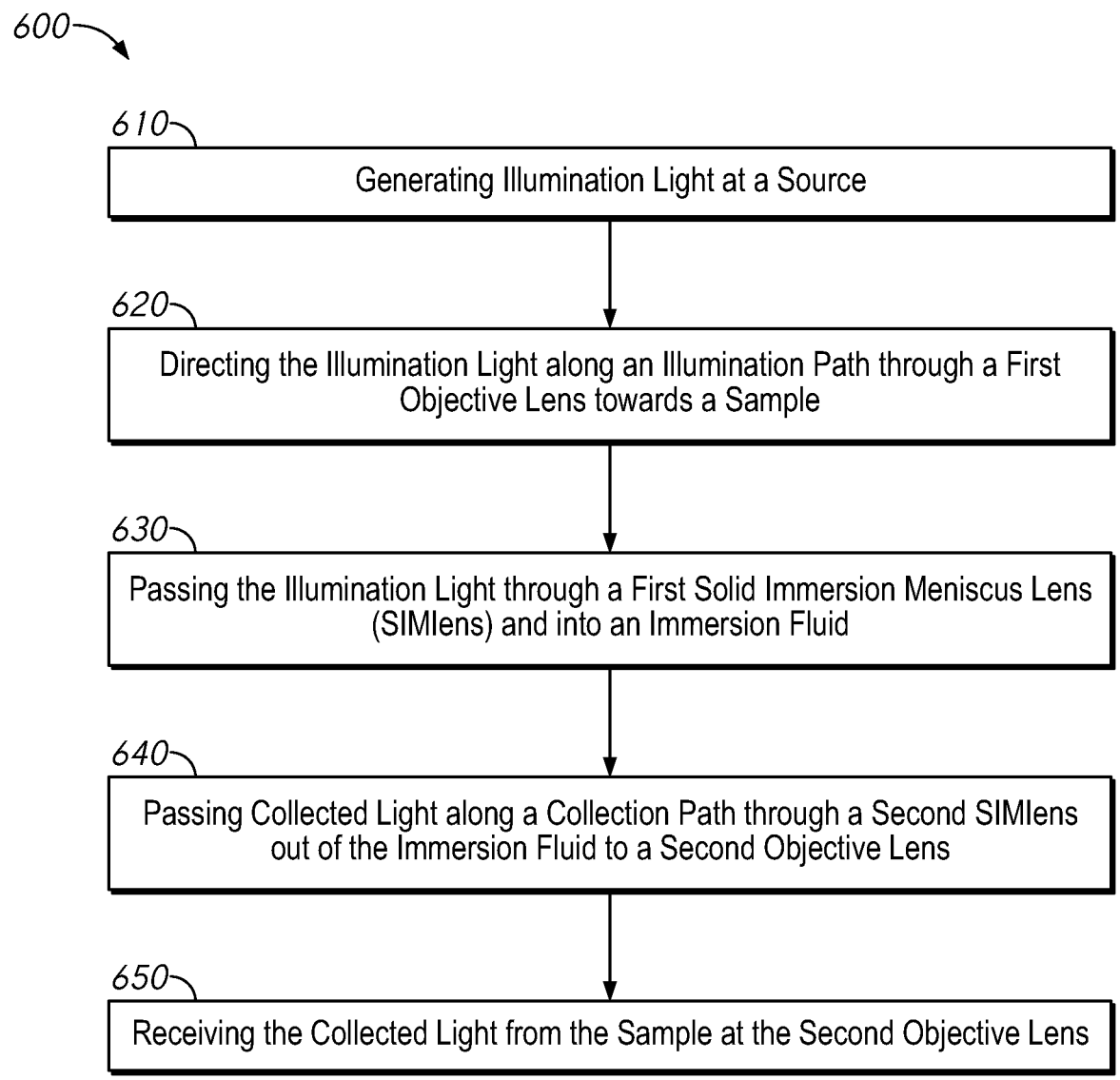
FIG. 6 is a flow chart of a method of imaging a sample according to some embodiments of the present disclosure.

FIG. 6 is a flow chart of a method of imaging a sample according to some embodiments of the present disclosure. The method 600 may be implemented by one or more of the optical systems described herein.

The method may generally begin with box 610, which describes generating illumination light at a source. The source (e.g., source 118 if FIG. 1) may be a coherent or non-coherent source, and may generate light across a relatively wide or narrow bandwidth.

Box 610 may generally be followed by box 620, which describes directing the illumination light along an illumination path through a first objective lens towards a sample. One or more illumination optics (e.g., 120 of FIG. 1) may be used to couple the illumination light from the source to the first objective lens. In some embodiments, the steps of box 620 may involve changing one or more properties of the illumination light with the illumination optics. For example, box 620 may include filtering the light, reshaping the light (e.g., into a light sheet), splitting the light, combining the light, or combinations thereof. The first objective lens may be an illumination objective (e.g., 122 of FIG. 1) and may generate an illumination beam which is directed towards a focal region of the sample.

Box 620 may generally be followed by box 630 which describes passing the illumination light through a solid immersion meniscus (SIMlens) and into an immersion fluid. The SIMlens (e.g., 114 of FIG. 1) may be positioned along a wall of an immersion chamber, and may act as a window into the immersion chamber. The first objective lens may be located in an ambient environment outside of the immersion fluid. The SIMlens may have a first curved surface and a second curved surface, each of which may match a wavefront of the illumination light. After entering the immersion fluid, the illumination light may pass through the immersion fluid, enter the material of a sample holder and pass from the sample holder into the sample. In some embodiments, the immersion fluid, first SIMlens and ambient environment may all have different indices of refraction.

Box 630 may generally be followed by box 640, which describes passing collected light along a collection path through a second SIMlens out of the immersion fluid to a second objective lens. The collection path may originate at the focal region. The light along the collection path may be reflected, scattered, emitted or combinations thereof from the sample at the focal region. The collected light may pass through the sample and sample holder and into the immersion fluid. The collected light may exit the immersion fluid by passing through the second SIMlens. The second SIMlens may have a first curved surface and a second curved surface opposite the first curved surface. Each of the curved surfaces may match a wavefront of the light along the collection path. Accordingly, there may be minimal (or no) refraction as the collected light passes from the immersion fluid, through the material of the SIMlens and into the ambient environment which includes the second objective lens. In some embodiments, the immersion fluid, material of the second SIMlens and ambient environment may all have different indices of refraction. In some embodiments, the material of the second SIMlens may have the same index of refraction as the material of the first SIMlens. In some embodiments, the first and the second SIMlens may be made from the same material.

Box 640 may generally be followed by box 650, which describes receiving the collected light from the sample at the second objective lens. The second objective lens may provide the collected light to a detector. One or more collection optics between the second objective lens and the detector may alter one or more properties of the light such as direction, wavelength, beam shape, and combinations thereof.

After the collected light reaches the detector, the method 600 may include imaging a the sample based on the collected light. In some embodiments, the method 600 may include moving the sample holder to move the focal region relative to the sample. In some embodiments, the method may include moving the sample holder along an axis between a first side of the sample holder which supports the sample to a second side of the sample holder to generate a depth stack of images.

In some embodiments, the method 600 may include matching a refractive index of the immersion fluid to a refractive index of the sample or sample holder. For example, if the refractive index of the sample holder is known, then an immersion fluid may be chosen which matches the refractive index of the sample holder and the method 600 may include filling an immersion chamber with the selected immersion fluid. In some embodiments, the refractive index of the sample, material of the sample holder, and immersion fluid may match each other.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

It should be understood that terms like 'top' and 'side' are used for ease of explanation, and are only meant to indicate the relative positioning of various components. Other embodiments may use other arrangements of components. Various components and operations may be described with respect to certain wavelengths of light. It should be understood that other wavelengths (such as those outside the visible spectrum) would be used, and that light as used herein may represent any electromagnetic radiation. Certain materials may be described in terms of their optical properties (e.g., transparent) and it should be understood that materials with the desired properties may be chosen for any wavelength(s) of light used by the system.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An imaging apparatus comprising:
a sample holder having a first side and a second side opposite the first side;
an immersion chamber disposed on the second side of the sample holder;
an illumination objective lens positioned outside the immersion chamber and having a focal region beyond the first side of the sample holder; and
a collection objective lens positioned outside the immersion chamber and having a focal region that intersects with the focal region of the illumination objective lens, wherein both the illumination objective lens and the collection objective lens are positioned on the same side of the sample holder;
a first solid immersion meniscus lens (SIMlens) positioned between the illumination objective lens and the immersion chamber; and
a second SIMlens positioned between the collection objective lens and the immersion chamber, wherein the second SIMlens is independent of the first SIMlens, wherein each SIMlens has a first surface and second surface opposite the first surface, and wherein the second surface is adjacent to the immersion chamber and wherein light passing between the objective lens and the focal region is sufficiently close to normal to the first surface and the second surface to produce low or no aberration, wherein the immersion chamber holds a liquid medium, and a gaseous medium is disposed between the first SIMlens and the illumination objective lens and the second SIMlens and the collection objective lens, and wherein the first surface and the second surface of the first SIMlens and the second SIMlens are each curved to match a wavefront of the light passing through the SIMlens.

2. The imaging apparatus of claim 1, wherein the first surface of the first SIMlens has a first curvature, the second surface of the first SIMlens has a second curvature, the first surface of the second SIMlens has a third curvature, and the second surface of the second SIMlens has a fourth curvature, and wherein the first, the second, the third, and the fourth curvatures are not equal to each other.

3. The imaging apparatus of claim 1, wherein the first surface of each of the first SIMlens and the second SIMlens has a radius of curvature equal to the distance from the first surface to the focal region and wherein the second surface of each of the first SIMlens and the second SIMlens has a radius of curvature of the distance from the second surface to the focal region.

4. The imaging apparatus of claim 1, wherein the first surface of the first SIMlens has a first radius of curvature, the second surface of the first SIMlens has a second radius of curvature, the first surface of the second SIMlens has a third radius of curvature, and the second surface of the second SIMlens has a fourth radius of curvature and wherein the first, the second, the third, and the fourth radii of curvature are not equal to each other.

5. The imaging apparatus of claim 1 further comprising:
a source configured to produce illumination light, wherein the first objective lens is configured to direct the illumination light as an illumination beam towards the focal region; and
a detector configured to receive collected light, wherein the second objective lens is configured to receive light from the focal region.

6. The imaging apparatus of claim 1, wherein the first objective lens has a first optical axis and the second objective lens has a second optical axis, and wherein the first optical axis is approximately orthogonal to the second optical axis.

7. The imaging apparatus of claim 1, further comprising a lens turret configured to hold the objective lens and at least one additional objective lens and configured to selectably position one of the objective lens and the at least one additional objective lens along an optical path including the focal region.

8. The imaging apparatus of claim 1, wherein the first SIMlens forms a first portion of a base of the immersion chamber, and the second SIMlens forms a second portion of the base of the immersion chamber that is spatially separated from the first portion.

9. An imaging apparatus comprising:
a sample holder having a first side and a second side opposite the first side;
an immersion chamber adjacent to the second side;
a first objective lens positioned outside the immersion chamber in an ambient environment, the first objective lens configured to focus light on a focal region beyond the first side;
a second objective lens positioned outside the immersion chamber in the ambient environment, the second objective lens configured to focus light on the focal region and being positioned on the same side of the sample holder as the first objective lens; and
a solid immersion meniscus lens (SIMlens) positioned between the first objective lens and the immersion chamber, but not between the second objective lens and the immersion chamber,
wherein the ambient environment has a first index of refraction,
the SIMlens has a second index of refraction different than the first index of refraction, and
the sample holder having a third index of refraction different than the first and the second index of refraction,
wherein the immersion chamber holds a liquid medium, and a gaseous medium is disposed between the SIMlens and the first objective lens, and
wherein the SIMlens has a first curved surface and a second curved surface opposite the first curved surface and wherein the first curved surface and the second curved surface are shaped to match a wavefront of light passing between the first side and the first objective lens.

10. The imaging apparatus of claim 9, wherein the first curved surface has a radius of curvature equal to a distance between the first curved surface and a focal region of the objective lens, and wherein the second curved surface has a radius of curvature equal to a distance between the second curved surface and the focal region.

11. The imaging apparatus of claim 9, wherein the second objective lens is an immersion objective disposed in the immersion chamber so as to be in contact with immersion fluid contained in the immersion chamber.

12. The imaging apparatus of claim 9, wherein the SIMlens is a first SIMlens, and further comprising a second SIMlens positioned between the second objective lens and the immersion chamber, wherein the second SIMlens is independent of the first SIMlens.

13. The imaging apparatus of claim 12, wherein the second SIMlens has an index of refraction equal to the second index of refraction.

14. The imaging apparatus of claim 12, wherein the first objective lens is configured to direct an illumination beam towards a focal region beyond the first side and the second objective lens is configured to collect light from the focal region.

15. The imaging apparatus of claim 12, wherein the first SIMlens forms a first portion of a base of the immersion chamber, and the second SIMlens forms a second portion of the base of the immersion chamber that is spatially separated from the first portion.

16. An imaging method comprising:
directing illumination light along an illumination path through a first objective lens, an immersion fluid, a sample holder and into a sample; and
receiving collected light from the sample at a second objective lens positioned on the same side of the sample holder as the first objective lens, wherein the received light passes along a collection path through the sample holder, the immersion fluid, and a solid immersion meniscus lens (SIMlens),
wherein the SIMlens has a first curved surface and a second curved surface each configured to match a wavefront of the collected light, and wherein the second curved surface is adjacent to the immersion fluid, and wherein the illumination light does not pass through the SIMlens, and
wherein the immersion chamber holds a liquid medium, and a gaseous medium is disposed between the SIMlens and the first objective lens.

17. The imaging method of claim 16, wherein the illumination path includes a second SIMlens positioned between the first objective lens and the immersion fluid.

18. The imaging method of claim 16, wherein a refractive index of the immersion fluid is matched to a refractive index of the sample.

19. The imaging method of claim 16, further comprising imaging the sample based on the collected light.

20. The imaging method of claim 19, wherein the sample holder has a first side configured to support the sample and a second side opposite the first side, the second side adjacent to the immersion fluid, the method further comprising scanning the sample holder along an axis from the first side to the second side to the second side to generate a depth stack of images.

* * * * *